United States Patent
Formey

(10) Patent No.: US 9,352,651 B2
(45) Date of Patent: May 31, 2016

(54) GUIDANCE TOOL FOR ADJUSTING POSITION OF AUTONOMOUS CRUISE CONTROL ASSEMBLY

(75) Inventor: James B. Formey, Detroit, MI (US)

(73) Assignee: FCA US LLC, Auburn Hills, MI (US)

( * ) Notice: Subject to any disclaimer, the term of this patent is extended or adjusted under 35 U.S.C. 154(b) by 1172 days.

(21) Appl. No.: 13/327,807

(22) Filed: Dec. 16, 2011

(65) Prior Publication Data

US 2013/0152358 A1  Jun. 20, 2013

(51) Int. Cl.
| | | |
|---|---|---|
| *B60K 31/00* | (2006.01) | |
| *B23P 6/00* | (2006.01) | |
| *B23P 19/12* | (2006.01) | |
| *G01S 15/93* | (2006.01) | |

(52) U.S. Cl.
CPC ............... *B60K 31/0008* (2013.01); *B23P 6/00* (2013.01); *B23P 19/12* (2013.01); *G01S 15/931* (2013.01); *B23P 2700/50* (2013.01); *G01S 2015/937* (2013.01); *G01S 2015/938* (2013.01); *Y10T 29/49778* (2015.01)

(58) Field of Classification Search
CPC ............... B60K 31/0008; G01S 15/931; G01S 2015/938; G01S 2015/937; Y10T 29/49778
USPC ........... 81/484, 451, 452, 453, 454, 455, 456, 81/457, 458, 487; 29/464, 468, 453, 29/281.6; 343/711, 712, 713; 342/70, 71, 342/72; 33/286, 288, 228, 299, 600; 408/103, 104, 108, 85, 115 R, 115 B, 408/72 B
See application file for complete search history.

(56) References Cited

U.S. PATENT DOCUMENTS

| | | | | | |
|---|---|---|---|---|---|
| 2,131,846 | A | * | 10/1938 | Nutt | ................................. 12/139 |
| RE23,201 | E | * | 2/1950 | Price | ................................. 81/451 |
| 2,565,505 | A | * | 8/1951 | Lamb | .............................. 81/451 |
| 2,913,824 | A | * | 11/1959 | Drennan | ......................... 33/228 |
| 3,616,514 | A | * | 11/1971 | Laverty | .......................... 29/281.6 |
| 3,822,944 | A | * | 7/1974 | Hopkins et al. | .......... 356/139.06 |
| 3,901,497 | A | * | 8/1975 | Dearman | ......................... 269/37 |
| 3,909,908 | A | * | 10/1975 | Brefka | ............................ 29/417 |
| 4,063,365 | A | * | 12/1977 | Hopkins et al. | ................. 33/288 |
| 4,108,025 | A | * | 8/1978 | Stine et al. | ....................... 81/484 |
| 4,672,732 | A | * | 6/1987 | Ramspacher et al. | .......... 29/429 |
| 4,820,206 | A | * | 4/1989 | Jullien et al. | ................... 439/782 |
| 4,924,349 | A | * | 5/1990 | Buehler et al. | ................. 361/643 |
| 5,018,414 | A | * | 5/1991 | Naumann | ........................ 81/484 |
| 5,201,552 | A | * | 4/1993 | Hohmann et al. | .......... 285/124.4 |

(Continued)

OTHER PUBLICATIONS

VisiCon Automatisierungstechnik GmbH, Kompetenz in Scheinwerfereinstellung, Assistance-Systems-Adaptive Cruise Control, http://www.visicon-online.de/en/2_3_2_advanced_cruise_control_calibration_systems_for_advan . . . , 1 page, 2009-2011.

*Primary Examiner* — Christopher M Koehler

(74) *Attorney, Agent, or Firm* — Ralph E. Smith

(57) ABSTRACT

A guidance tool guides movement of an adjustment tool toward an adjustment member of an autonomous cruise control (ACC) assembly. The ACC assembly is moveably coupled to a vehicle body, and the adjustment member is adjustable with the adjustment tool to change a position of the ACC assembly relative to the vehicle body. The guidance tool includes an attachment member that removably attaches to the ACC assembly. The guidance tool also includes a guide surface that guides the adjustment tool toward the adjustment member when the attachment member is removably attached to the ACC assembly.

14 Claims, 4 Drawing Sheets

(56) References Cited

U.S. PATENT DOCUMENTS

| | | | |
|---|---|---|---|
| 5,398,419 A * | 3/1995 | Schmidt et al. | 33/203 |
| 5,553,521 A * | 9/1996 | Dunn | 81/484 |
| 5,620,449 A * | 4/1997 | Faccioli et al. | 606/98 |
| 6,029,335 A * | 2/2000 | Hui et al. | 29/464 |
| 6,035,533 A * | 3/2000 | Warnke et al. | 29/898.07 |
| 6,044,535 A * | 4/2000 | Strickland | 29/225 |
| 6,374,507 B1 * | 4/2002 | Lehto | 33/645 |
| 6,602,027 B2 * | 8/2003 | Deaton et al. | 408/72 R |
| 6,714,156 B1 | 3/2004 | Ibrahim et al. | |
| 6,809,806 B1 | 10/2004 | Carnevale et al. | |
| 6,842,152 B2 | 1/2005 | Kikuchi | |
| 7,134,814 B1 * | 11/2006 | Park | 408/103 |
| 7,346,994 B2 * | 3/2008 | Shevela | 33/288 |
| 7,877,849 B2 * | 2/2011 | Panek et al. | 29/426.1 |
| 8,464,413 B1 * | 6/2013 | Prater et al. | 29/426.1 |
| 8,830,119 B2 * | 9/2014 | Borruso | 342/167 |
| 2001/0008446 A1 * | 7/2001 | Hopfenmuller | 356/139.09 |
| 2004/0017308 A1 * | 1/2004 | Kikuchi | 342/74 |
| 2005/0222746 A1 * | 10/2005 | Shevela | 701/93 |
| 2007/0299452 A1 * | 12/2007 | Curry | 606/89 |
| 2014/0053388 A1 * | 2/2014 | Mazzei | 29/464 |
| 2014/0111370 A1 * | 4/2014 | Aleem et al. | 342/70 |

\* cited by examiner

GUIDANCE TOOL FOR ADJUSTING POSITION OF AUTONOMOUS CRUISE CONTROL ASSEMBLY

FIELD

The following relates to a guidance tool and, more particularly, relates to a guidance tool for adjusting the position of an autonomous cruise control (ACC) assembly relative to a vehicle body.

BACKGROUND

Autonomous cruise control (ACC) systems have been proposed for vehicles. These systems automatically detect secondary vehicles and other objects surrounding a primary vehicle. Also, these systems automatically can adjust the speed of the primary vehicle or otherwise control the vehicle depending on the detected status of the surrounding object(s).

Typically, ACC systems include a laser system, radar system, or other sensor system that is housed within a housing, and the housing is mounted to the vehicle body. Also, the ACC system can be calibrated by adjusting the position of the housing relative to the vehicle until the sensor system is in a predetermined orientation. For instance, a reference calibration laser beam can be generated, and the position of the ACC system can be adjusted relative to the vehicle body until the calibration laser beam is aimed directly at a reference area of the ACC system (e.g., aimed at a mirror of the ACC system).

SUMMARY

A guidance tool that guides movement of an adjustment tool toward an adjustment member of an autonomous cruise control (ACC) assembly is disclosed. The ACC assembly is moveably coupled to a vehicle body, and the adjustment member is adjustable with the adjustment tool to change a position of the ACC assembly relative to the vehicle body. The guidance tool includes an attachment member that removably attaches to the ACC assembly. The guidance tool also includes a guide surface that guides the adjustment tool toward the adjustment member when the attachment member is removably attached to the ACC assembly.

A method for changing a position of an autonomous cruise control (ACC) assembly relative to a vehicle body is also disclosed. The method includes removably attaching a guidance tool to the ACC assembly and guiding movement of an adjustment tool toward an adjustment member of the ACC assembly using a guide surface of the guidance tool while the guidance tool is removably attached to the ACC assembly. The method further includes adjusting the adjustment member to thereby change the position of the ACC assembly relative to the vehicle body.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
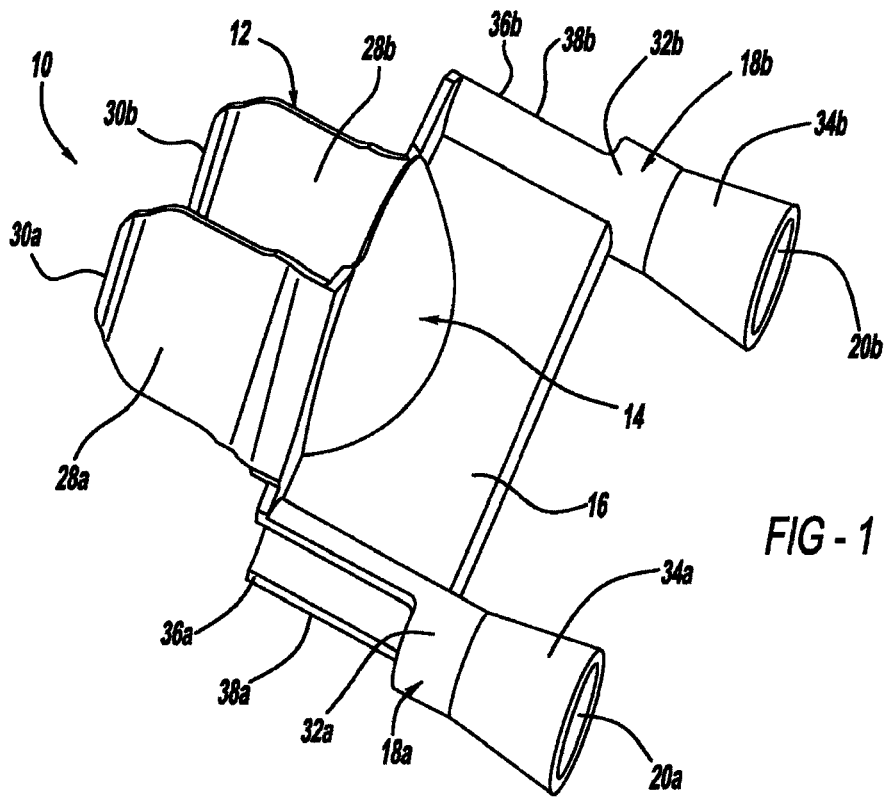
FIG. 1 is a top perspective view of a guidance tool according to exemplary embodiments of the present disclosure.
Figure 2:
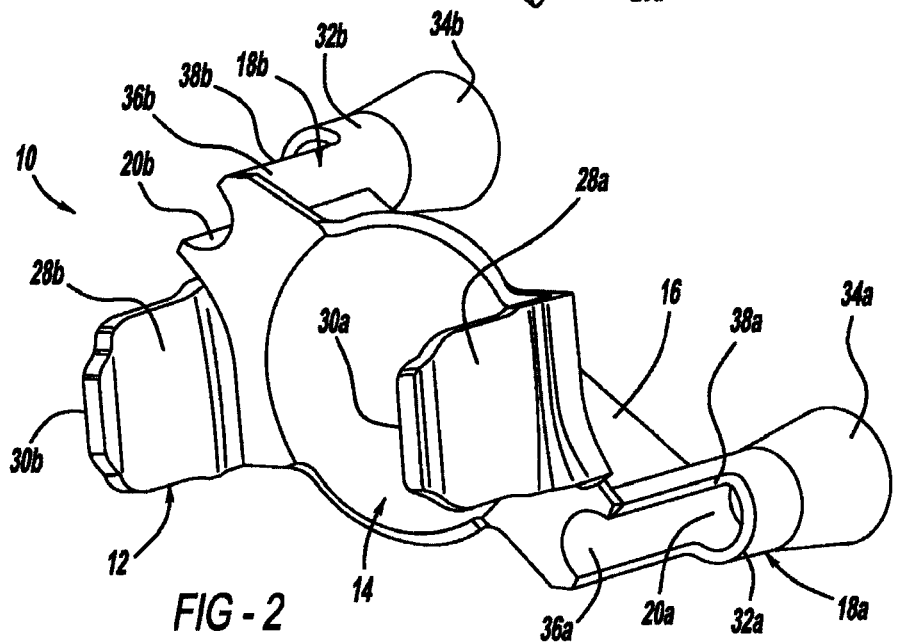
FIG. 2 is a rear perspective view of the guidance tool of FIG. 1.

Referring initially to FIGS. 1 and 2, a guidance tool 10 is shown according to various exemplary embodiments of the present disclosure. The guidance tool 10 can generally include an attachment member 12, a cover member 14, a grip member 16, and one or more (e.g., two) guide members 18a, 18b, each of which will be discussed in detail below. The guide members 18a, 18b can each include a respective guide surface 20a, 20b. In some embodiments, the attachment member 12, cover member 14, grip member 16, and guide members 18a, 18b are integrally attached such that the guidance tool 10 has a monolithic, uni-body construction. Also, the guidance tool 10 can be made out of any suitable materials, such as rigid polymeric material.

Figure 5:
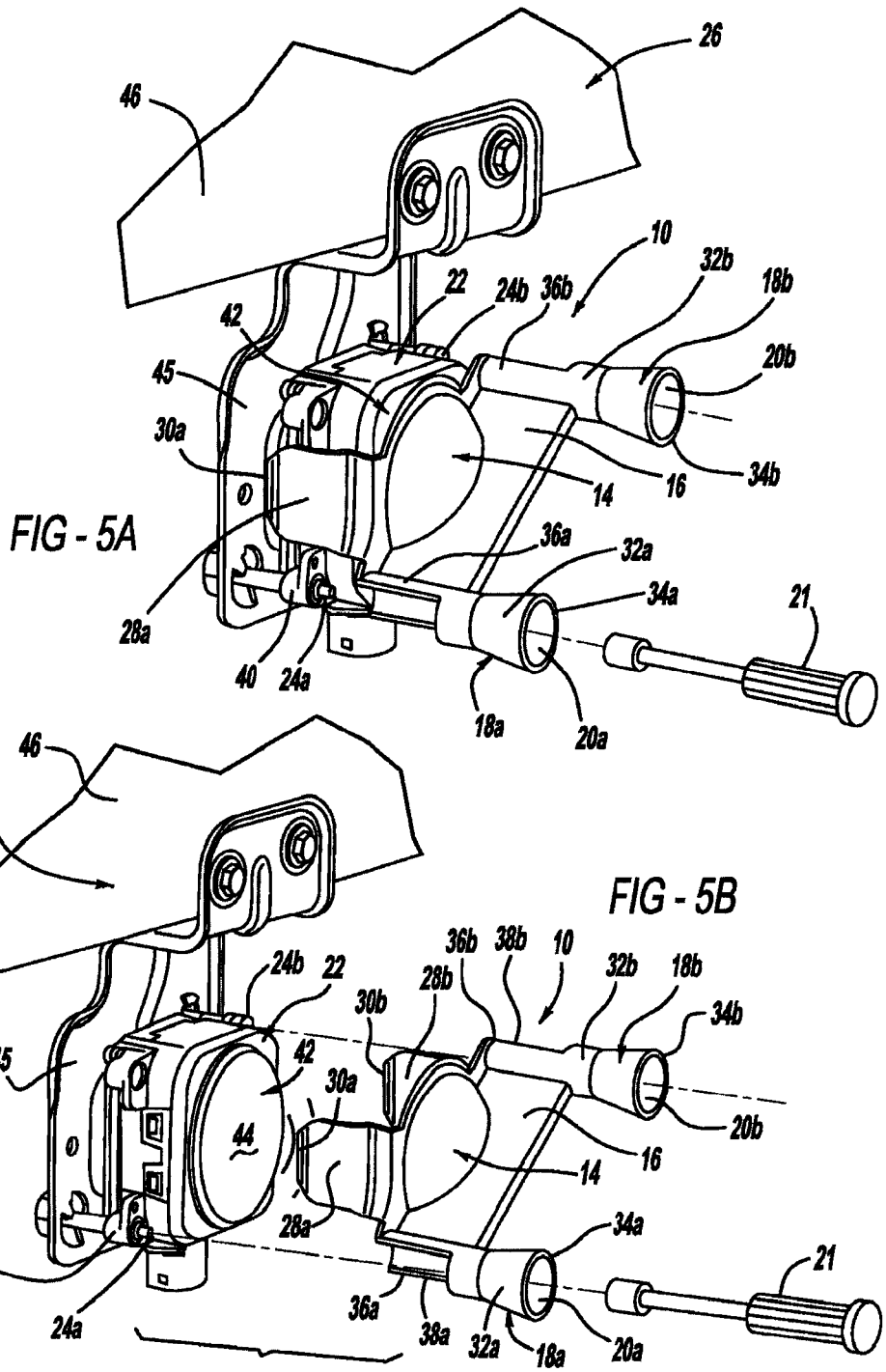
FIG. 5A is a front perspective view of the guidance tool shown removably attached to the ACC assembly and an adjustment tool that is guided toward the ACC assembly by the guidance tool.
FIG. 5B is an exploded view of the ACC system and guidance tool.

As shown in FIGS. 5A and 5B, the guidance tool 10 can be removably attached to an autonomous cruise control (ACC) assembly 22, which is mounted to a vehicle body 26. Then, the guide surfaces 20a, 20b of the guidance tool 10 can be used to guide an adjustment tool 21 toward an adjustment member 24a, 24b of the ACC assembly 22. Next, the tool 21 can engage the adjustment members 24a, 24b to change the position of the ACC assembly 22 relative to the vehicle body 26. As will be discussed in detail below, the guidance tool 10 can facilitate these procedures such that the position of the ACC assembly 22 can be adjusted quickly, accurately, and without damaging the vehicle body 26.

Referring back to FIGS. 1 and 2, exemplary embodiments of the guidance tool 10 will be discussed in greater detail. It will be appreciated that the features of the guidance tool 10 can be sized, shaped, or otherwise designed according to the size and shape of the ACC assembly 22 as will be discussed.

The attachment member 12 can include a first clip 28a and a second clip 28b. The first and second clips 28a, 28b can be thin walls that project away from the cover member 14 in one direction. The first and second clips 28a, 28b can be spaced apart from each other on opposite sides of the cover member 14. Also, the first and second clips 28a, 28b can resiliently flex slightly relative to the cover member 14. The first and second clips 28a, 28b can each terminate at a respective end 30a, 30b. The ends 30a, 30b can be curved toward each other slightly such that the ends 30a, 30b are closer together than other portions of the clips 28a, 28b.

The cover member 14 can be shaped substantially similar to a spherical cap and can be hollow. The grip member 16 can be substantially thin and flat. The grip member 16 can extend across the cover member 14 and can project from the cover member 14 in a direction opposite the clips 28a, 28b. In some embodiments, the grip member 16 can include a roughened (e.g., gnarled) surface, an indented surface intended for receiving one or more fingers, or a high-friction material so that the grip member 16 is less likely to inadvertently slip from the user's grasp.

Moreover, the guidance member 18a, 18b can include one or more hollow tubes 32a, 32b. In the embodiments shown, there are two tubes 32a, 32b; however, the guidance tool 10 can include any suitable number of tubes 32a, 32b. Each tube 32a, 32b can include a respective first end 34a, 34b and second end 36a, 36b. Each second end 36a, 36b can be fixed to a respective end of the grip member 16 such that the tubes 32a, 32b are spaced apart from each other. Each first end 34a, 34b can extend axially away from the grip member 16 and can be frusto-conic in shape or otherwise tapered outward radially from its respective axis. Thus, each first end 34a, 34b can extend annularly and continuously about its respective axis. Furthermore, each second end 36a, 36b can include an opening 38a, 38b that extends longitudinally along the respective tube 32a, 32b such that the second end 36a, 36b of each tube 32a, 32b extends only partially about its respective axis. The tubes 32a, 32b can each be axially straight, and the axes of the tubes 32a, 32b can be substantially parallel to each other. The tubes 32a, 32b can each include a respective interior surface, and these interior surfaces can function as the guide surfaces 20a, 20b for the guidance tool 10 as will be discussed.

Referring now to FIGS. 3-6, embodiments of the ACC system 22 will be discussed. As mentioned above, the guidance tool 10 can be used to adjust a position of the ACC system 22 relative to the vehicle body 26. In some embodiments, the ACC system 22 can be of a known type, such as those disclosed in U.S. Pat. No. 7,346,994, filed Mar. 30, 2004, and issued to Shevela, which is hereby incorporated by reference in its entirety. However, it will be appreciated that the ACC system 22 can be of any suitable type, such as a radar-based or laser-based sensor system for detecting objects surrounding the vehicle body 26. It will also be appreciated that the ACC system 22 can be positionally adjusted relative to the vehicle body 26, for instance, to calibrate the ACC system 22 and to ensure that the ACC system 22 can accurately detect objects surrounding the vehicle body 26.

Figure 3:
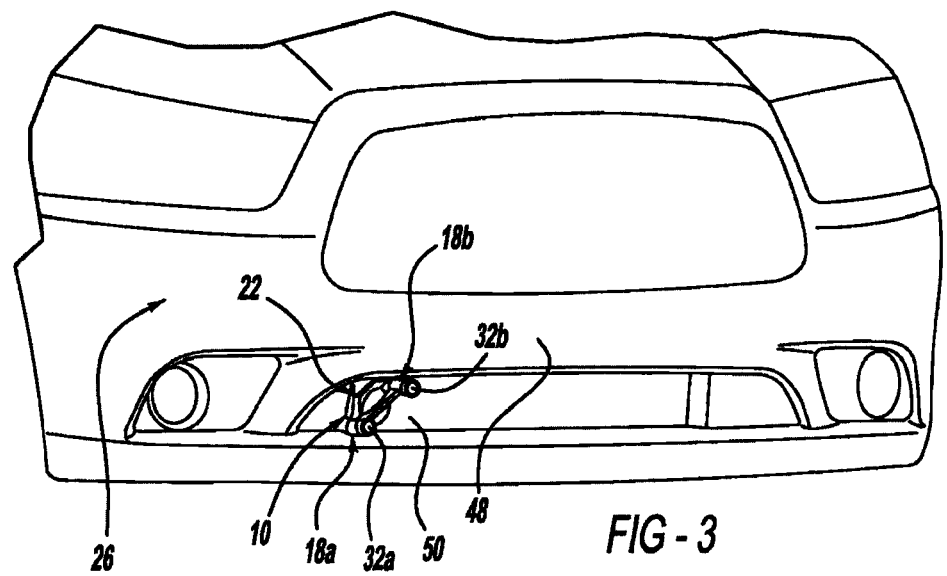
FIG. 3 is a front perspective view of the guidance tool of FIG. 1 shown removably attached to an autonomous cruise control (ACC) assembly of a vehicle.
Figure 4:
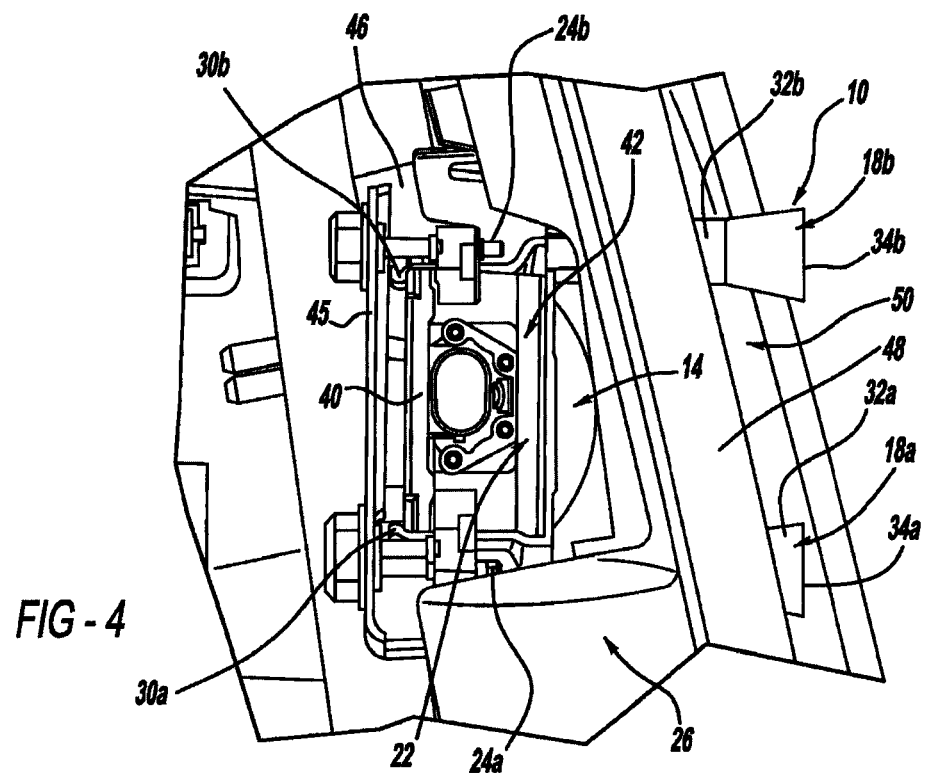
FIG. 4 is a bottom view of the guidance tool of FIG. 1 shown removably attached to the ACC assembly and shown projecting from an outer surface of vehicle facia.

The ACC system 22 can include a mounting portion 40 and a sensor portion 42. The sensor portion 42 can include a sensor surface 44 (FIG. 5B), and a sensor beam (laser, radar, etc.) can be transmitted to and/or from the sensor surface 44 for detecting objects surrounding the vehicle body 26. Also, as shown in FIGS. 3 and 4, a front facia 48 of the vehicle body 26 can include an opening 50, and the mount 45 and ACC system 22 can be recessed below (i.e., recessed inboard from) the facia 48.

The mounting portion 40 can be moveably attached to a plate-like mount 45, which hangs below a bumper assembly 46 of the vehicle. The mounting portion 40 can be moveably attached to the mount 45 via the adjustment members 24a, 24b. In some embodiments, the adjustment members 24a, 24b can include known fasteners with a driver head (e.g., hexagonal head), and when the members 24a, 24b are individually rotated relative to the mount 45, the ACC system 22 can shift in various directions to thereby change position relative to the vehicle body 26.

As shown in FIGS. 5A and 5B, the guidance tool 10 can be removably attached to the ACC system 22. In some embodiments, the guidance tool 10 can be snap-fit attached to the ACC system 22 such that the guidance tool 10 can be quickly and conveniently attached without fasteners, adhesives, or other means. Specifically, in order to attach the guidance tool 10, the user can hold the grip member 16 with the clips 28a, 28b extending toward the ACC system 22 and then move the tool 10 toward the ACC system 22. Eventually, the ends 30a, 30b of the clips 28a, 28b can abut against respective sides of the ACC system 22, and further movement of the tool 10 toward the ACC system 22 can cause the clips 28a, 28b to resiliently deflect away from each other. The tool 10 can be further advanced toward the ACC system 22 until the ends 30a, 30b come to rest on the back side of the ACC system 22 as shown in FIGS. 4 and 5A. In this position, the clips 28a, 28b can cooperate to compress the ACC system 22 therebetween to keep the tool 10 in a fixed position relative to the ACC system 22. Also, in this position, the cover member 14 can cover the sensor surface 44 of the ACC system 22.

It will be appreciated that the tool 10 can be attached to and removed from the ACC system 22 relatively quickly and easily because of the snap-fit attachment. However, the tool 10 could be configured for attachment in any other suitable fashion. Moreover, it will be appreciated that the tool 10 can be configured to protect the ACC system 22 and/or the front facia 48 from damage. In this regard, the cover member 14 can cover the sensor surface 44 for protection. Also, the openings 38a, 38b of the tool 10 can provide clearance from impacting the facia 48 of the vehicle body 26.

Figure 6:
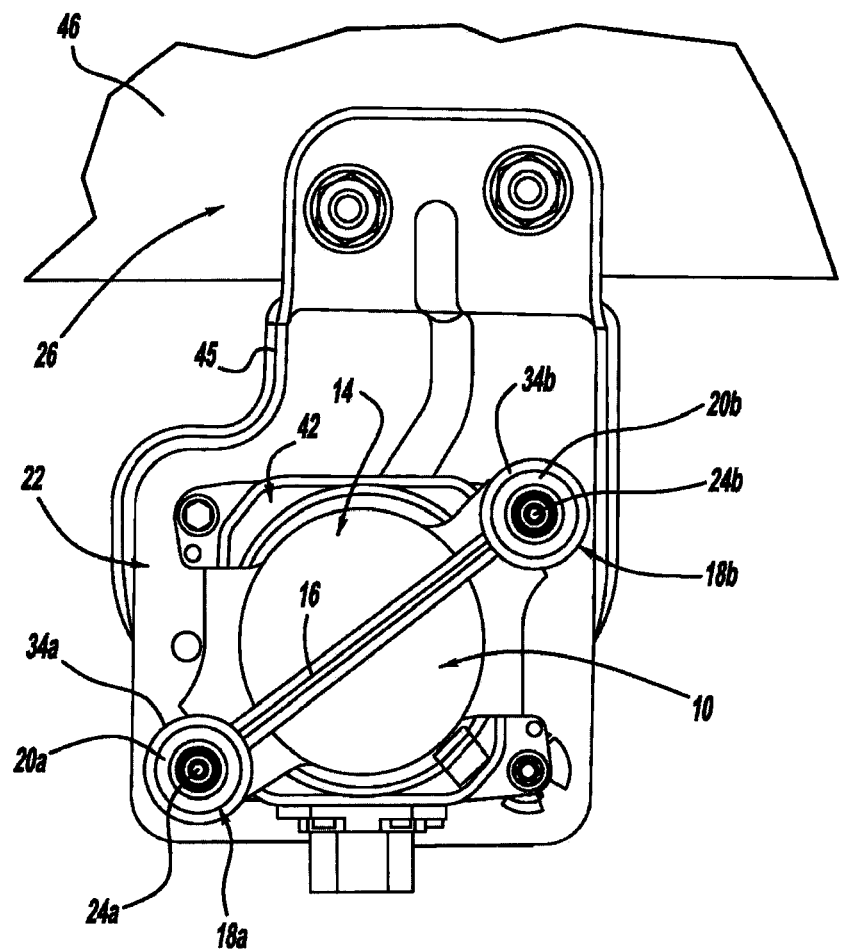
FIG. 6 is a front view of the guidance tool shown removably attached to the ACC assembly.

Still further, once the tool 10 is attached, the tubes 32a, 32b can be substantially aligned, respectively, with the adjustment members 24a, 24b as shown in FIGS. 5A, 5B, and 6. Also, once attached, the ends 34a, 34b of the tubes 32a, 32b can project outward (i.e., forward from) the outer surface of the facia 48 as shown in FIG. 4. (During adjustment of the ACC system 22, the worker can often be located underneath the vehicle such that FIG. 4 approximates the worker's view.) Therefore, because the ends 34a, 34b of the tubes 32a, 32b project from the facia 48, the tubes 32a, 32b can be easily located by the worker, and the adjustment tool 21 can be easily inserted into the tubes 32a, 32b without impacting the front facia 48 of the vehicle body 26.

Accordingly, once the tool 10 is attached to the ACC system 22, the worker can extend the adjustment tool 21 (e.g., a handheld driver with a socket, etc.) sequentially into the tubes 32a, 32b (FIGS. 5A and 5B). The outwardly tapered surfaces of the ends 34a, 34b can facilitate insertion of the tool 21 into the tube 32a, 32b, without inadvertently impacting the facia 48. Also, the tool 21 can abut and slide along the respective guide surface 20a, 20b such that the guide surfaces 20a, 20b can guide the tool 21 toward engagement with the respective adjustment member 24a, 24b. Once the tool 21 engages the respective adjustment member 24a, 24b, the tool 21 can be rotated about its axis to rotate the respective adjustment member 24a, 24b to thereby adjust the position of the ACC system 22 relative to the vehicle body 26. Then, the tool 21 can be removed and then inserted into the other tube 32a, 32b to engage the other adjustment member 24a, 24b and the other adjustment member 24a, 24b can be rotated using the tool 21 to further adjust the position of the ACC system 22. The position of the ACC system 22 can be adjusted until the ACC system 22 is in a predetermined orientation and is calibrated.

It will be appreciated that the openings 38a, 38b of the tool 10 can provide clearance for the adjustment tool 21 (e.g., for the socket head of the tool 21) during use and removal. For instance, the position of the ACC system 22 and the tool 10 relative to the vehicle body 26 may be changed, but the position of the adjustment members 24a, 24b (and, thus, the adjustment tool 21) may remain the same. The openings 38a, 38b of the tool 10 can provide sufficient clearance so that the ACC system 22 and tool 10 can shift without abutting against the adjustment tool 21. Also, the openings 38a, 38b can similarly provide clearance for removal of the adjustment tool 21 from the tool 10.

Subsequently, the guidance tool 10 can be removed from the ACC system 22. In some embodiments, the guidance tool 10 can be pulled manually off of the ACC system 22 by pulling forward on the guidance tool 10 until the clips 28a, 28b disengage from the ACC system 22.

Accordingly, the guidance tool 10 can substantially facilitate adjustment and calibration of the ACC system 22. The guidance tool 10 can be attached to the ACC system 22 and removed easily and quickly. Also, by using the guidance tool 10, the user is unlikely to impact and damage the facia 48 with the adjustment tool 21.

It will be appreciated that the guidance tool 10 can be varied in a number of ways. For instance, the number and shape of the clips 28a, 28b can be varied such that the tool 10 properly fits to the ACC system 22. Also, the cover member 14 can be sized and shaped to sufficiently cover and protect the sensor surface 44. Moreover the number, shape and size of the hollow tubes 32a, 32b can be varied according to the number and location of the adjustment members 24a, 24b of the ACC system 22.

What is claimed is:

1. A guidance tool for guiding movement of an adjustment tool toward an adjustment member of an autonomous cruise control (ACC) assembly, the ACC assembly being moveably coupled to a vehicle body, the adjustment member being adjustable with the adjustment tool to change a position of the ACC assembly relative to the vehicle body, the guidance tool comprising:
   an attachment member that removably attaches to the ACC assembly; and
   a guide surface defining a passageway that opens to the adjustment member when the attachment member is removably attached to the ACC assembly, the guide surface receiving the adjustment tool such that at least part of the adjustment tool travels through the passageway and engages the adjustment member.

2. The guidance tool of claim 1, wherein the attachment member snap-fits to the ACC assembly.

3. The guidance tool of claim 2, wherein the attachment member includes a first clip and a second clip that cooperate to compress the ACC assembly to snap-fit to the ACC assembly.

4. The guidance tool of claim 3, wherein the first clip includes a first end and the second clip includes a second end, the first and second ends extending generally toward each other to retain the attachment member to the ACC assembly.

5. The guidance tool of claim 1, wherein the ACC assembly includes a sensor surface, a sensor beam being transmitted to or from the sensor surface, and further comprising a cover member that covers the sensor surface when the attachment member is removably attached to the ACC assembly.

6. The guidance tool of claim 5, wherein the cover member is hollow and has a general shape of a spherical cap.

7. The guidance tool of claim 1, wherein the vehicle includes a facia with an outer surface, wherein the adjustment member is recessed below the outer surface of the facia, wherein the guide surface projects outward from the outer surface of the facia when the attachment member is removably attached to the ACC assembly.

8. The guidance tool of claim 1, wherein the passageway is at least one hollow tube, an interior surface of the at least one hollow tube defining the guide surface, an axis of the at least one hollow tube being substantially co-axially aligned with the adjustment member when the attachment member is removably attached to the ACC assembly.

9. The guidance tool of claim 8, wherein the at least one hollow tube includes an end that is tapered outward.

10. The guidance tool of claim 8, wherein the at least one hollow tube includes a first end and a second end, the first end extending annularly and continuously about the axis, the second end including an opening such that the second end extends only partially about the axis.

11. The guidance tool of claim 8, wherein the at least one hollow tube includes a first hollow tube and a second hollow tube, the first hollow tube defining a first guide surface that guides the adjustment tool toward a first adjustment member, the second hollow tube defining a second guide surface toward a second adjustment member.

12. The guidance tool of claim 11, further comprising a grip member that extends between the first and second hollow tubes, the grip member operable for grasping when removably attaching the attachment member to the ACC assembly.

13. The guidance tool of claim 12, wherein the grip member, the first and second hollow tubes, and the attachment member are integrally connected so as to be monolithic.

14. The guidance tool of claim 1, wherein the passageway is at least one hollow tube, an interior surface of the at least one hollow tube defining the guide surface, an axis of the at least one hollow tube being substantially aligned with the adjustment member such that the axis intersects the adjustment member when the attachment member is removably attached to the ACC assembly.

* * * * *